(12) United States Patent
Payne et al.

(10) Patent No.: US 10,781,911 B2
(45) Date of Patent: Sep. 22, 2020

(54) PLANETARY GEAR ASSEMBLY

(71) Applicant: CNH Industrial America LLC, New Holland, PA (US)

(72) Inventors: Daniel Payne, Westmont, IL (US); Michael Jensen, Lockport, IL (US); Brad Banwarth, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 104 days.

(21) Appl. No.: 16/130,135

(22) Filed: Sep. 13, 2018

(65) Prior Publication Data
US 2020/0088291 A1    Mar. 19, 2020

(51) Int. Cl.
| | | |
|---|---|---|
| F16H 57/08 | (2006.01) | |
| F16H 48/40 | (2012.01) | |
| F16C 19/44 | (2006.01) | |
| F16C 35/06 | (2006.01) | |
| F16H 57/031 | (2012.01) | |

(52) U.S. Cl.
CPC ........... *F16H 57/082* (2013.01); *F16C 19/44* (2013.01); *F16C 35/06* (2013.01); *F16H 48/40* (2013.01); *F16H 57/031* (2013.01); *F16C 2226/74* (2013.01)

(58) Field of Classification Search
None
See application file for complete search history.

(56) References Cited

U.S. PATENT DOCUMENTS

| | | | | |
|---|---|---|---|---|
| 3,252,355 A | * | 5/1966 | Hewko | .................... F16H 13/06 475/184 |
| 4,756,212 A | * | 7/1988 | Fuehrer | ............... F16H 57/0479 475/159 |
| 4,783,183 A | | 11/1988 | Gardella | |

(Continued)

FOREIGN PATENT DOCUMENTS

| | | |
|---|---|---|
| CN | 203571001 U | 4/2014 |
| DE | 88 03 118.7 U1 | 4/1988 |

(Continued)

OTHER PUBLICATIONS

"54682 A518 A618 46RE 47RE 48RE Transmission Reverse Drum to Support Washer", Transmission Parts USA, retrieved from http://www.transmissionpartsusa.com/, May 2, 2017 (4 pages).

(Continued)

*Primary Examiner* — Justin Holmes
(74) *Attorney, Agent, or Firm* — Rickard K. DeMille; Rebecca L. Henkel

(57) ABSTRACT

A vehicle including a chassis and a planetary gear assembly supported by the chassis. The planetary gear assembly includes a planetary carrier having a carrier locking feature, at least one planetary gear, at least one pin supporting the at least one planetary gear and including at least one pin locking feature, and at least one thrust washer coupled to and supported by the at least one pin. The at least one thrust washer includes a first locking member engaging with the carrier locking feature, which prevents the at least one thrust washer from rotating, and a second locking member engaging with the at least one pin locking feature such that the at least one thrust washer prevents the at least one pin from rotating and axially sliding.

13 Claims, 5 Drawing Sheets

(56) References Cited

U.S. PATENT DOCUMENTS

| | | |
|---|---|---|
| 4,959,043 A | 9/1990 | Klotz et al. |
| 5,368,528 A | 11/1994 | Farrell |
| 5,472,059 A | 12/1995 | Schlosser et al. |
| 5,529,547 A | 6/1996 | Okuda et al. |
| 6,023,836 A | 2/2000 | Matsuoka et al. |
| 6,467,853 B1 | 10/2002 | Swartzendruber et al. |
| 7,520,190 B2 | 4/2009 | Hasegawa et al. |
| 8,182,387 B2 | 5/2012 | Fujii et al. |
| 8,210,984 B2 | 7/2012 | Schaeffer et al. |
| 8,523,730 B2 | 9/2013 | Miyawaki et al. |
| 8,894,537 B2 | 11/2014 | Norem et al. |
| 9,500,240 B2 | 11/2016 | Fuse et al. |
| 2004/0023749 A1* | 2/2004 | Zelikov .............. F16H 57/082 475/331 |
| 2006/0144175 A1 | 7/2006 | Nawa et al. |
| 2006/0240935 A1* | 10/2006 | Yamazaki ............ F16H 48/10 475/249 |
| 2007/0205029 A1* | 9/2007 | Leone .................. B60K 6/365 180/65.225 |
| 2007/0207890 A1 | 9/2007 | Penksik |
| 2013/0217535 A1* | 8/2013 | Suzuki .................. F16C 17/04 475/331 |

FOREIGN PATENT DOCUMENTS

| | | |
|---|---|---|
| DE | 10 2015 219 455 A1 | 4/2017 |
| KR | 10-2013-0106937 A | 10/2013 |
| WO | 2016/165706 A1 | 10/2016 |
| WO | WO-2018059982 A1 * | 4/2018 .............. F16C 17/04 |

OTHER PUBLICATIONS

"TH350 rebuild tech", Crankshaft Coalition Wiki, retrieved from http://www.crankshaftcoalition.com/wiki/, May 2, 2017 (34 pages).

"Thrust Washer and Shims", TSR Racing, retrieved from https://www.tsr-racing.com/chrysler-a727/thrust-washer-andshims.html, May 2, 2017 (5 pages).

* cited by examiner

PLANETARY GEAR ASSEMBLY

FIELD OF THE INVENTION

The present invention pertains to vehicles and, more specifically, to vehicles that include planetary gear assemblies.

BACKGROUND OF THE INVENTION

It is well known for vehicles to include an epicyclic, i.e., planetary, gear system for providing a gear change between an input and output. For example, a planetary gear system may be used in a transmission to selectively change the gear ratios between the engine and the drive shaft for driving the wheels. Additionally, for example, in industrial vehicles, such as tractors, a planetary gear system may be directly incorporated into the axles for adjusting the torque transmission between the drive shaft and the wheels. Generally, a planetary gear system includes a sun gear, a ring gear coaxial with and surrounding the sun gear, and multiple planetary gears circumferentially disposed around the sun gear and in meshed connection with and transmitting rotational power between the sun gear and ring gear. The planetary gear system also includes a planetary carrier which mounts the planetary gears and couples the planetary gears to the output shaft of the planetary gear system.

The planetary carrier can be mounted to the planetary gears via pins, needle roller bearings in between the pins and planetary gears, and thrust washers. The pins, which support the planetary gears and thrust washers, can be connected and secured relative to the planetary carrier by pressing the pins into the planetary carrier or bolting the pins to the planetary carrier. For example, in front axle planetary gear systems, the pins can be pressed, e.g. press-fitted, into the planetary carrier externally from the outside of the axle. However, pressing the pins externally can lead to a leak path for oil to seep past the pins, due to the lack of a dedicated sealing element or feature, and may render the parts to be non-serviceable because the pins cannot be press-fitted into the planetary carrier twice. Additionally, for example, if the pins are not pressed into the planetary carrier, the pins may be free to rotate or fall out of the planetary carrier; and thereby, the pins are bolted onto the planetary carrier by way of a respective bolt extending through a corresponding hole in the planetary carrier and engaging with a milled slot in the pin. In more detail, the planetary carrier can have a blind hole at one end and a bolted-on cover at the other end, and the bolt can extend radially through the cover and into the slot of the pin. This non-pressing method may generally avoid the issues of the press-fitted pins; yet, the bolts can become loose which may lead to oil leakage.

The thrust washers, supported by a respective pin, are located on each side of the planetary gear. The thrust washers can effectively act as wear surfaces for protecting the planet carrier from wear caused by thrust loads acting on the planetary gears, since the needle roller bearing itself cannot resist axial thrust forces. For example, the thrust washers can be composed of hardened steel to prevent the moving, hardened pins from digging to the soft iron of the planetary carrier. However, if the thrust washers are free to move, e.g. rotate or axially slide, during operation of the planetary gear system, the thrust washers, which are intended to protect the other components may undesirably damage the other components of the planetary gear system.

What is needed in the art is a cost-effective planetary gear assembly for securing the pins and preventing the thrust washers and pins from moving during operation of the vehicle.

SUMMARY OF THE INVENTION

In one exemplary embodiment formed in accordance with the present invention, there is provided a locking feature within the planet carrier or cover, a pin with at least one shoulder and at least one pin locking feature, and one or more thrust washer(s) that contact the at least one shoulder and have a first member engaged with the locking feature and a second member engaged with the pin locking feature so that the thrust washer(s) simultaneously protect the components of the planetary gear assembly, prevent the pin from rotating, and contain the pin so that the pin does not axially slide out of the cover.

In another exemplary embodiment formed in accordance with the present invention, there is provided a vehicle including a chassis and a planetary gear assembly supported by the chassis. The planetary gear assembly includes a planetary carrier having a carrier locking feature, a cover, at least one bearing, at least one planetary gear coupled with the at least one bearing and positioned in between the planetary carrier and the cover, at least one pin supporting the at least one planetary gear and coupling with the planetary carrier and the cover, the at least one pin including at least one pin locking feature, and at least one thrust washer coupled to and supported by the at least one pin. The at least one thrust washer includes a first locking member engaging with the carrier locking feature, which prevents the at least one thrust washer from rotating, and a second locking member engaging with the at least one pin locking feature such that the at least one thrust washer prevents the at least one pin from rotating and axially sliding.

In yet another exemplary embodiment formed in accordance with the present invention, there is provided a planetary gear assembly for a vehicle, including a planetary carrier having a carrier locking feature, a cover, at least one bearing, at least one planetary gear coupled with the at least one bearing and positioned in between the planetary carrier and the cover, and at least one pin supporting the at least one planetary gear and coupling with the planetary carrier and the cover. The at least one pin includes a first shoulder, a second shoulder, a first pin locking feature, and a second pin locking feature. The planetary gear assembly also includes a first thrust washer coupled to and supported by the at least one pin, the first thrust washer abutting the first shoulder for preventing the at least one pin from sliding axially, the first thrust washer including a first locking member engaging with the carrier locking feature for preventing the first thrust washer from rotating, and the first thrust washer including a second locking member engaging with the first pin locking feature for preventing the at least one pin from rotating. The planetary gear assembly also includes a second thrust washer coupled to and supported by the at least one pin, the second thrust washer includes a locking member engaging with the second pin locking feature, and the second thrust washer abutting the second shoulder for preventing the at least one pin from sliding axially.

In yet another exemplary embodiment formed in accordance with the present invention, there is provided a planetary gear assembly for a vehicle, including a planetary carrier, a cover, at least one bearing, at least one planetary gear coupled with the at least one bearing and positioned in between the planetary carrier and the cover, and at least one pin supporting the at least one planetary gear. The at least one pin includes a middle portion that couples with the at least one bearing and has a middle portion diameter, a first side portion coupling with the planetary carrier, and a second side portion coupling with the cover, the first and second side portions each having a side portion diameter, at least one of the side portion diameters being smaller than the middle portion diameter such that a respective interface between the middle portion and at least one of the first side portion and the second side portion defines a shoulder, and at least one of the first side portion and the second side portion having a pin locking feature. The planetary gear assembly also includes a first thrust washer coupled to and supported by the first side portion, and a second thrust washer coupled to and supported by the second side portion. At least one of: the planet carrier includes a carrier locking feature, and the first thrust washer includes a first locking member that engages with the carrier locking feature, and the cover includes a cover locking feature, and the second thrust washer includes a first locking member that engages with the cover locking feature.

One possible advantage of the exemplary embodiment of the planetary gear assembly is that a single component, the thrust washer, performs three roles in simultaneously acting as a thrust washer for the bearing, preventing the pin from rotating, and containing the pin so that the pin does not axially slide out of the cover.

Another possible advantage of the exemplary embodiment of the planetary gear assembly is that the thrust washers lower the production costs and advantageously reduce the possibility of leakage in the planetary gear assembly.

Yet another possible advantage of the exemplary embodiment of the planetary gear assembly is that the assembly is simplified and streamlined because the thrust washers are clocked to one another via the flat cutouts on the pin.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown Like numerals indicate like elements throughout the drawings. In the drawings.

DETAILED DESCRIPTION OF THE INVENTION

Figure 1:
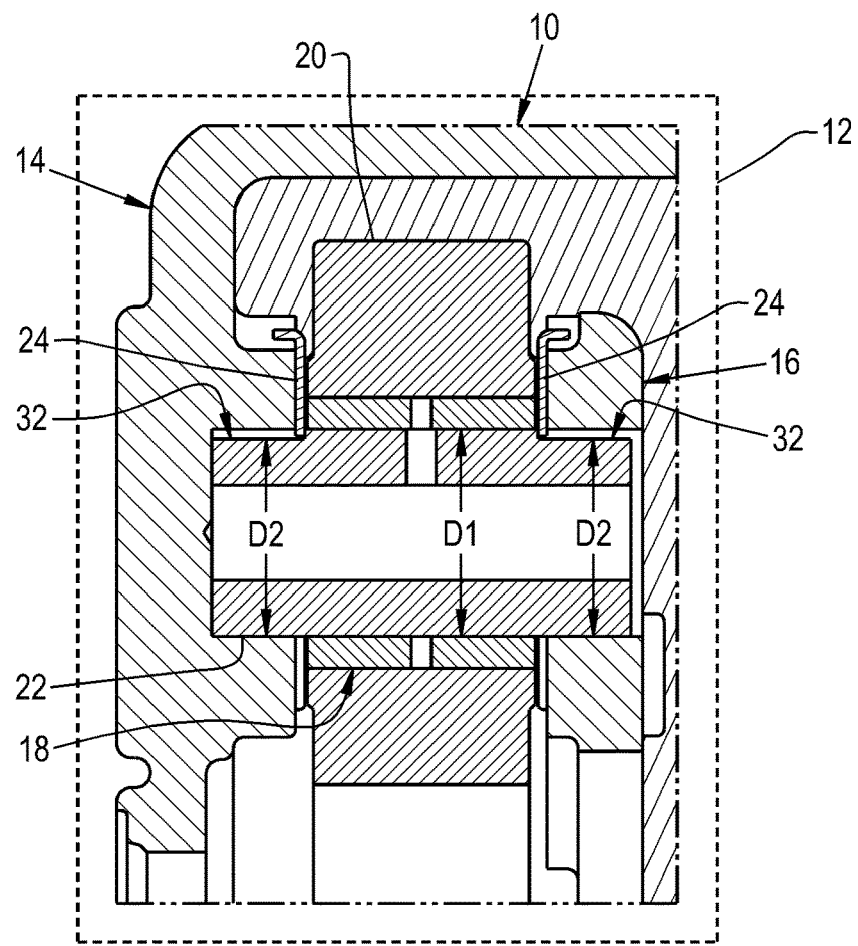
FIG. 1 illustrates a cross-sectional view of an exemplary embodiment of a planetary gear assembly for a vehicle, in accordance with an exemplary embodiment of the present invention.

Referring now to the drawings, and more particularly to FIGS. 1-6, there is shown a planetary gear assembly 10 for a vehicle 12. The vehicle 12 can be in the form of any desired vehicle 12, for example an agricultural vehicle such as a tractor, that includes a chassis, a prime mover, front and rear axles, wheels coupled to the axles, and the planetary gear assembly 10 for each wheel. Each planetary gear assembly 10 can be in the form of a planetary axle assembly 10, which is supported by the chassis of the vehicle 12 and operably couples each respective wheel to the chassis.

The planetary gear assembly 10 generally includes a planetary carrier 14, a cover 16, at least one needle bearing 18, at least one planetary gear 20, at least one pin 22, and at least one thrust washer 24. The thrust washer(s) 24 can perform three separate functions such that the thrust washer(s) 24 can be configured for protecting the planetary carrier 14 and cover 16 from the needle bearing 18, preventing the pin 22 from rotating, and containing the pin 22 so that the pin 22 is prevented from axially sliding.

Figure 4:
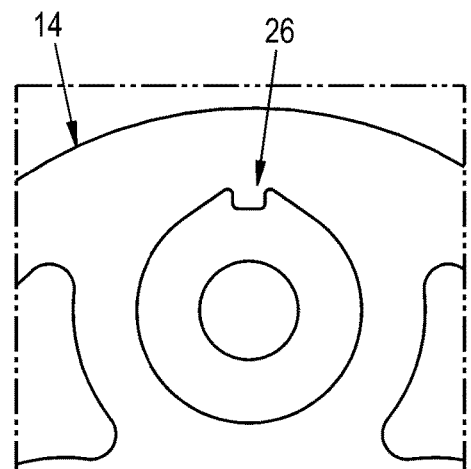
FIG. 4 illustrates a front view of the planetary carrier of the planetary gear assembly of FIG. 1, in accordance with an exemplary embodiment of the present invention.

The planetary carrier 14 includes a carrier locking feature 26 (FIG. 4). The carrier locking feature 26 can have any desired shape. For example, the carrier locking feature 26 can be in the form of a U-shaped feature that extrudes outwardly from the inside surface of the planetary carrier 14. Alternatively, the carrier locking feature 26 can be in the form of a slot, groove, or recess. The carrier locking feature 26 can be monolithically formed, e.g. cast, with the body of the planetary carrier 14 or separately attached to the planetary carrier 14 via welding and/or fasteners. The planetary carrier 14 may be composed of any desired material, such as metal. For instance, the planetary carrier 14 may be composed of a relatively soft metal which must generally be protected by the thrust washer 24. The planetary carrier 14 can be in the form of any desired planetary carrier capable of coupling to the planetary gear(s) 20.

Figure 2:
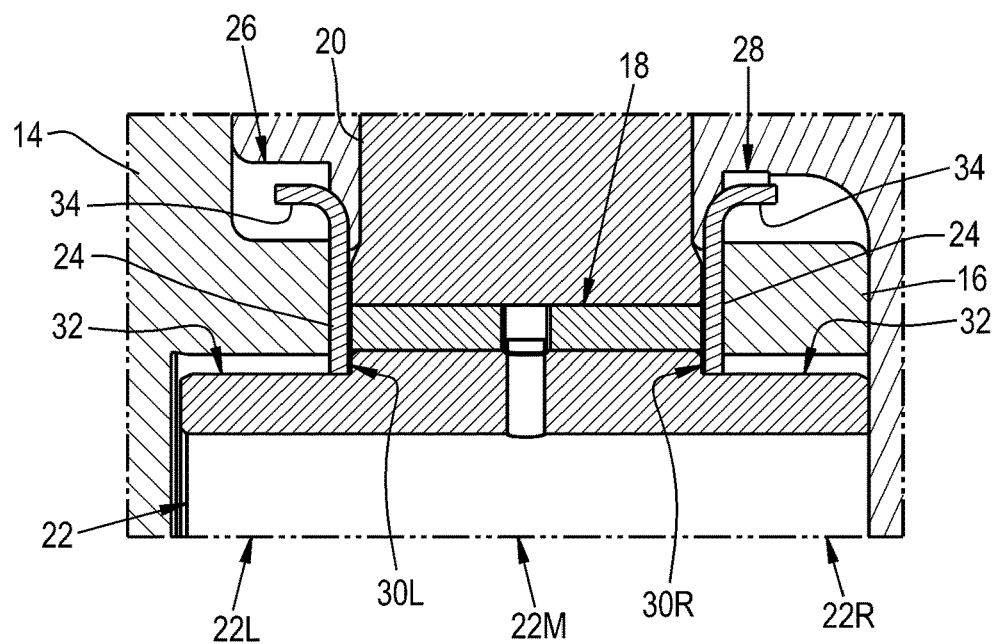
FIG. 2 illustrates another cross-sectional view of the planetary gear assembly of FIG. 1, in accordance with an exemplary embodiment of the present invention.
Figure 3:
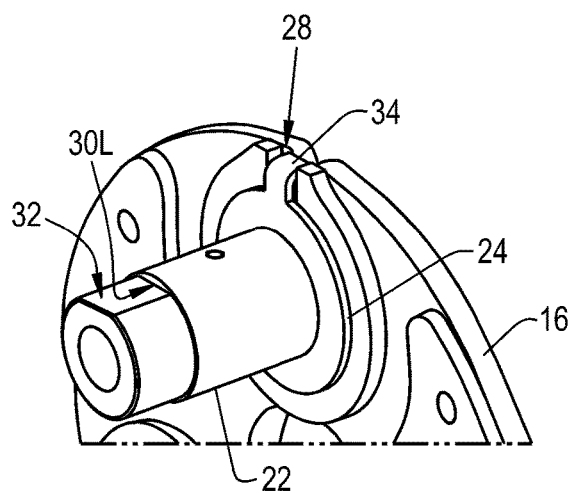
FIG. 3 illustrates a perspective view of the cover, thrust washer, and pin of the planetary gear assembly of FIG. 1, in accordance with an exemplary embodiment of the present invention.

The cover 16 couples with the planetary carrier 14 for protecting the planetary gear(s) 20. The cover 16 includes a cover locking feature 28 (FIGS. 2-3). The cover locking feature 28 can be located on the inside surface of the cover 16 and/or extend through the body of the cover 16. The cover locking feature 28 can be in the form of any desired shape, for example, it can be in the form of a U-shaped feature that extrudes perpendicularly from the inside surface of the cover 16. Alternatively, the cover locking feature 28 can be in the form of a slot, groove, or recess. The cover locking feature 28 can be monolithically formed or separately attached to the body of the cover 16, in a similar fashion to the carrier locking feature 26. The cover 16 may be composed of any desired material, such as metal, for example a soft metal. The cover 16 can be in the form of any desired cover 16 which couples with the pin(s) 22.

Each planetary gear 20 is coupled with a respective needle bearing 18 and is positioned in between the planetary carrier 14 and the cover 16. The planetary gear assembly 10 can include one, two, three, four, or more planetary gear(s) 20. The planetary gears 20 can be in the form of any desired planetary gears 20.

Figure 5:
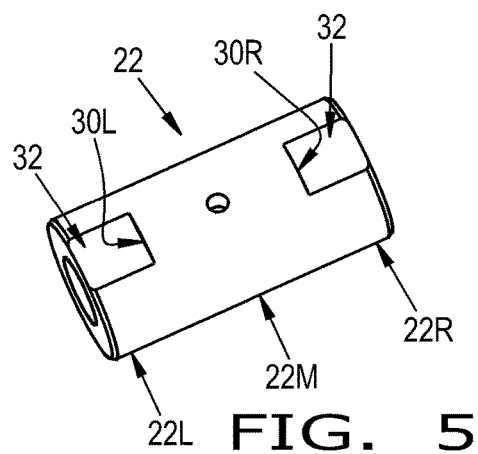
FIG. 5 illustrates a perspective view of the pin of the planetary gear assembly of FIG. 1, in accordance with an exemplary embodiment of the present invention.

The pin(s) 22 support a respective planetary gear 20; and thereby, the number of pins 22 corresponds to the number of planetary gears 20. Each pin 22 includes a middle portion 22M and adjacent first and second, e.g. left and right, portions 22L, 22R (FIG. 5). In more detail, the left side portion 22L couples with the planetary carrier 14, and the right side portion 22R couples with the cover 16. The middle portion 22M couples with the at least one needle bearing 18 and has a middle portion diameter D1, and the left and right portions 22L, 22R have respective side portion diameters D2 that are smaller than the middle portion diameter D1 (FIG. 1). It should be appreciated however that each side portion can have a side portion diameter D2 that is equal to the middle portion diameter D1, or only one side portion diameter D2 can be smaller than the middle portion diameter D1. In this regard, one or both of the interfaces between the middle portion 22M and the left and right portions 22L, 22R can define a respective shoulder, such as first and second, e.g. left and right, shoulders 30L, 30R (FIG. 2). Each shoulder 30L, 30R can include a chamfer (unnumbered). Additionally or alternatively, the middle portion 22M may include the chamber of the shoulders 30L, 30R and/or a separate chamfer that can cover at least a portion or all of the circumference of the middle portion 22M. The chamfers of the shoulders 30L, 30R can help make the design of the planetary gear assembly 10 more reliable by eliminating transitional movement of the needle bearing 18 which would otherwise cause the needle bearing 18 to overhang the shoulders 30L, 30R. Each pin 22 can be composed of any desired material, such as metal.

Further, each pin 22 also includes at least one pin locking feature 32 located on the left side portion 22L and/or the right side portion 22R. In the present exemplary embodiment, each side portion 22L, 22R includes a respective pin locking feature 32. The pin locking feature 32 can be in the form of a groove, slot, recess, or cutout. As shown, the pin locking feature 32 is a flat cutout 32 which creates a flat surface at the top of the pin 22 (FIGS. 2 and 5). The flat cutout 32 can extend from the lateral ends of the pin to the shoulders 30L, 30R. In this regard, the shoulders 30L, 30R define the inboard end of the flat cutouts 32 on the left and right side portions 22L, 22R. The pin locking feature 32 can have any desired form and cross-sectional shape, for example, the pin locking feature 32 can have a triangular cutout instead of the flat-rectangular cutout 32 as shown.

Figure 6:
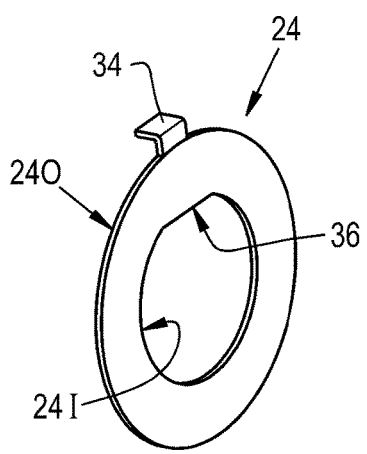
FIG. 6 illustrates a perspective view of the thrust washer of the planetary gear assembly of FIG. 1, in accordance with an exemplary embodiment of the present invention.

The one or more thrust washer(s) 24 can be supported by the pin 22. Each thrust washer 24 may include a first locking member 34 that is configured for preventing the thrust washer 24 from rotating and a second locking member 36 that is configured for preventing the pin 22 from rotating. Also, each thrust washer 24 includes an outer and inner periphery 24O, 24I such that the first and second locking members 34, 36 are respectively associated with the outer and inner peripheries 24O, 24I (FIG. 6). The inner periphery 24I defines an inner shape and contacts the pin 22. The first locking member 34 can protrude outwardly from the outer periphery 24O. The first locking member 34 can be in the form of a tab 34. In the present exemplary embodiment, the tab 34 is a bent tab 34 with a straight portion that extends vertically above the outer periphery 24O and a bent portion that extends substantially perpendicularly, and horizontally, from the straight portion (FIG. 6). The second locking member 36 is the inner periphery 24I. In other words, the inner periphery 24I, and thereby its D-shape, defines the second locking member 36. As shown, the inner shape has a substantially D-shape with a circular portion and a flat portion. In this respect, as the pin 22 tries to the rotate, the flat cutout 32 of the pin 22 forcibly contacts the flat portion of the second locking member 36 such that the pin 22 is prevented from rotating. Each thrust washer 24 may include more than one tab 34, such as two, four, or more tabs, which may respectively engage with one or more pin locking feature(s) 32 of the pin 22.

By way of example only, the planetary gear assembly 10 can include a pair of thrust washers 24, such as a first and second, e.g. left and right, thrust washers 24 which respectively couple with the left and right side portions 22L, 22R of the pin 22. It should be appreciated that the pair of thrust washers 24 can be substantially similar. Thereby, the first locking members 34 of the thrust washers 24 can respectively engage with the carrier locking feature 26 and the cover locking feature 28, and the second locking members 36 can respectively engage with the pin locking features 32 of the left and right side portions 22L, 22R of the pin 22 (FIG. 2). In this respect, one thrust washer 24 can be located in between, and thereby contacting, i.e., abutting, the planetary carrier 14 and the left shoulder 30L, and the other thrust washer 24 can be located in between, and thereby contacting, the cover 16 and the right shoulder 30R. Since the thrust washers 24 extend beyond the needle bearing 18 and flank the front side of each shoulder 30L, 30R, the resulting relationship between the thrust washers 24 and the shoulders 30L, 30R prevents the pin 22 from axially moving (FIG. 2). For instance, because the thrust washers 24 are fixed relative to the planetary carrier 14 and the cover 16, when the pin 22 tries to slide out of the cover 16, e.g. to the right in FIG. 2, the right shoulder 30R will contact the abutting thrust washer 24 and the pin 22 will be prevented from sliding out of the cover 16. Therefore, the tabs 34 in combination with the inner peripheries 24I of the thrust washers 24 will prevent the pin 22 from rotationally moving and the annular bodies of the thrust washers 24, abutting the shoulders 30L, 30R, will prevent the pin 22 from axially moving.

Figure 7:
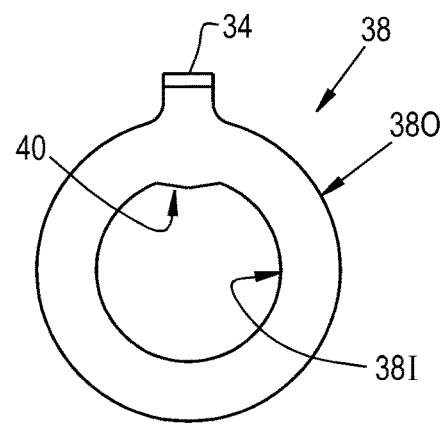
FIG. 7 illustrates a front view of another embodiment of a thrust washer with a triangular-shaped inner member, in accordance with an exemplary embodiment of the present invention.

Referring now to FIG. 7, there is shown another embodiment of a thrust washer 38 that includes an outer and inner periphery 38O, 38I, the first locking member, e.g. tab 34, extending above the outer periphery 38O, and a second locking member 40 which is the shape of the inner periphery 38I. The second locking member 40, i.e., the inner shape of the inner periphery 38I, has a circular portion and a triangular portion extending inwardly from the circular portion. The triangular portion having a first side and a second side such that as the pin 22 tries to rotate, the pin locking feature 32 contacts one of the sides and is prevented from rotating.

Thus, the pin 22 is rotationally fixed by the thrust washer 38. As can be appreciated, the second locking member 40 of the thrust washer 38 may more desirably disperse the force from the pin 22 across the profile of the triangular portion. In more detail, the parallel contact between the pin and the triangular portion of the thrust washer 38 will disperse the resulting contact forces more advantageously than would a line-contact relationship between the thrust washer 38 and pin 22. Thus, the resulting force from the pin 22 acting on the thrust washer 38 will not deform the thrust washer 38. It should be appreciated that the pin 22 may marginally rotate to allow the flat cutout 32 of the pin 22 to contact the triangular portion of the second locking member 40. It should also be appreciated that the planetary gear assembly 10 incorporate any combination of thrust washer(s) 24, 38.

Figure 8:
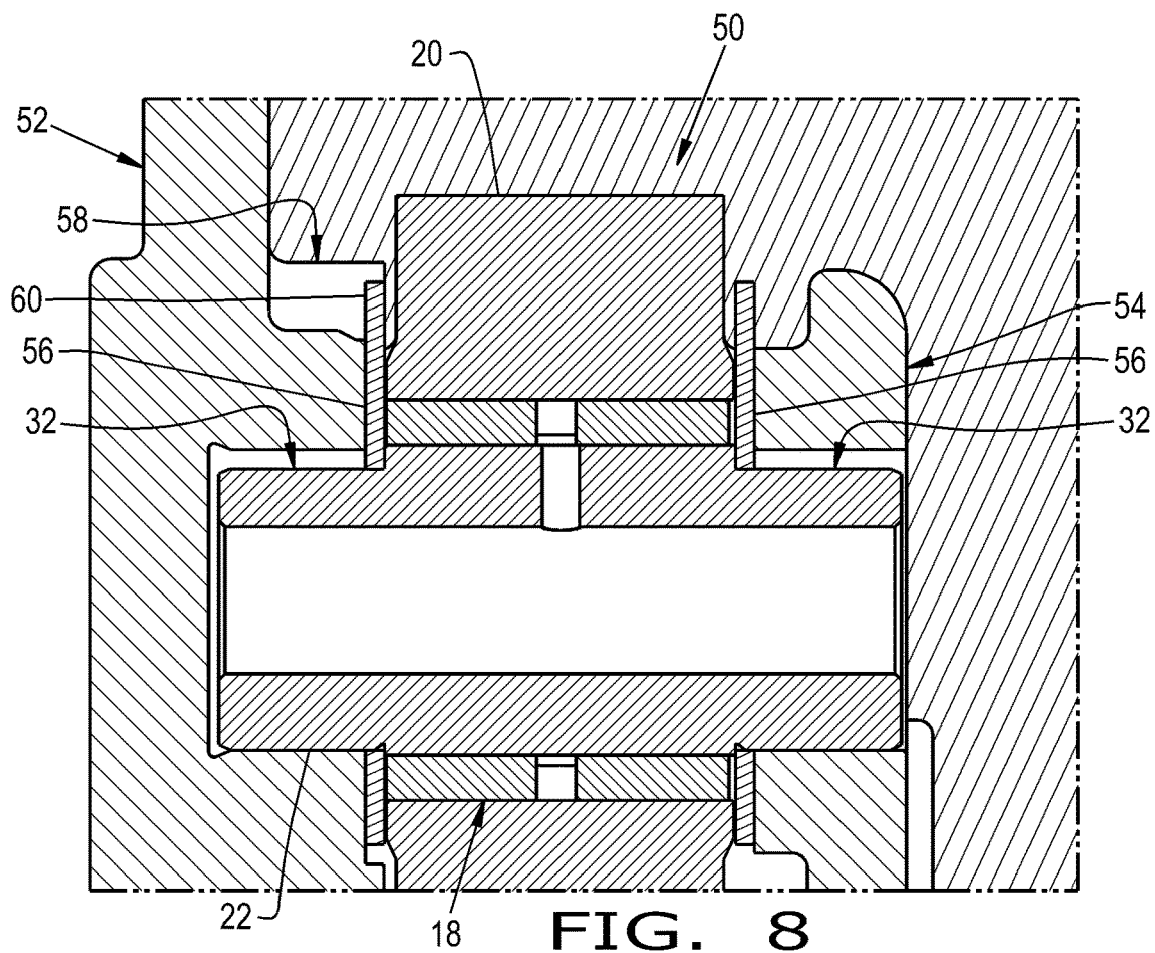
FIG. 8 illustrates a cross-sectional view of another embodiment of a planetary gear assembly, in accordance with an exemplary embodiment of the present invention.
Figure 9:
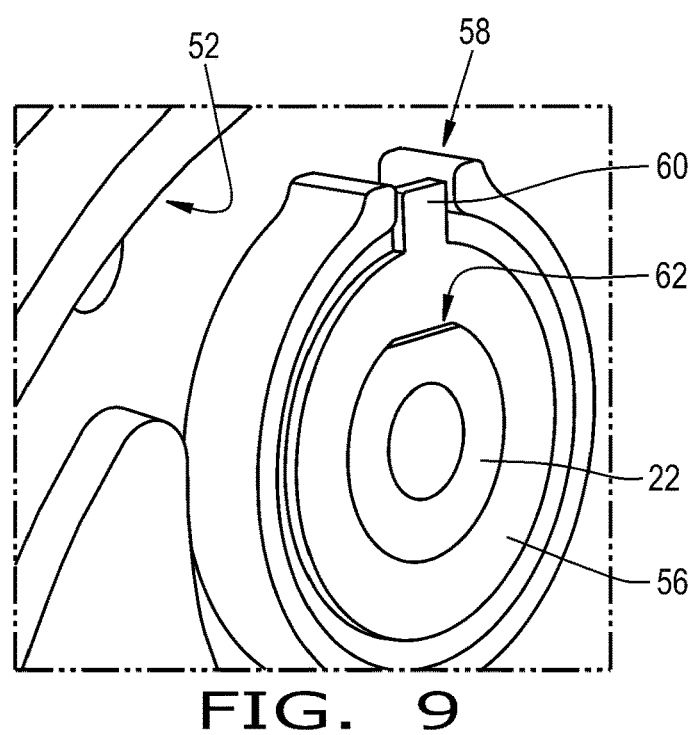
FIG. 9 illustrates a perspective view of the planetary carrier and thrust washer of FIG. 8, in accordance with an exemplary embodiment of the present invention.

Referring now to FIGS. 8-9, there is shown another embodiment of a planetary gear assembly 50 which generally includes the needle bearing(s) 18, planetary gear(s) 20, and the pin 22 of the planetary gear assembly 10 as well as a planetary carrier 52, a cover 54, and at least one thrust washer 56. Instead of the two thrust washers 24 which engage with the planetary carrier 14 and the cover 16 as in the planetary gear assembly 10, the planetary gear assembly 50 has only one thrust washer 56 which engages with the planetary carrier 52, or alternatively the carrier 52. Hence, the planetary gear assembly 50 reduces the manufacturing cost by requiring only one member to engage with and prevent the rotational movement of one thrust washer 56. As shown, the planetary carrier 52 includes a carrier locking feature 58 and the left thrust washer 56 engages with the carrier locking feature 58.

The planetary carrier 52 and the cover 54 can be designed substantially similarly to the planetary carrier 14 and the cover 16, as described above, except that the planetary carrier includes the carrier locking feature 58 and the cover 54 does not include a cover locking feature. The carrier locking feature 58 is shown as a slotted, cast feature 58 which receives at least a portion of the thrust washer 56. However, the locking feature 58 can be in any desired form and may have any desired shape, for example, a protrusion, a slot, a groove, a recess, etc. The carrier locking feature 58 may be monolithically formed with the body of the planetary carrier 52 or separately welded and/or fastened onto the body of the planetary carrier 52.

The thrust washer 56 may be substantially similar to the thrust washer 24 as described above, except that the first locking member 60 is in the form of a straight tab 60. Thereby, the thrust washer 56 includes a straight tab 60 and a second locking member 62 which is in the form of the second locking member 36, as described above. The tab 60 can be straight or bent, as in the first locking member 34, and/or the second locking member 60 can have a D-shape or triangular-shape in order to prevent the pin 22 from rotating. It should be appreciated that both thrust washers 56 can be substantially identical. Further, only one washer 56 may include the first and/or second locking member(s) as described herein, and the other washer can be a standard washer. As shown, the first, left thrust washer 56 includes the tab 60 and the second locking member 36, and the second, right thrust washer 56 only includes the second locking member 36 which interacts with the pin 22. Thereby, the left thrust washer 56 prevents the pin 22 from rotating, the pin 22 then prevents the right thrust washer 56 from rotating, and the right thrust washer 56 prevents the pin 22 from axially sliding. Hence, only one tab 60 of the left thrust washer 56 prevents rotation of the entire subassembly.

Figure 10:
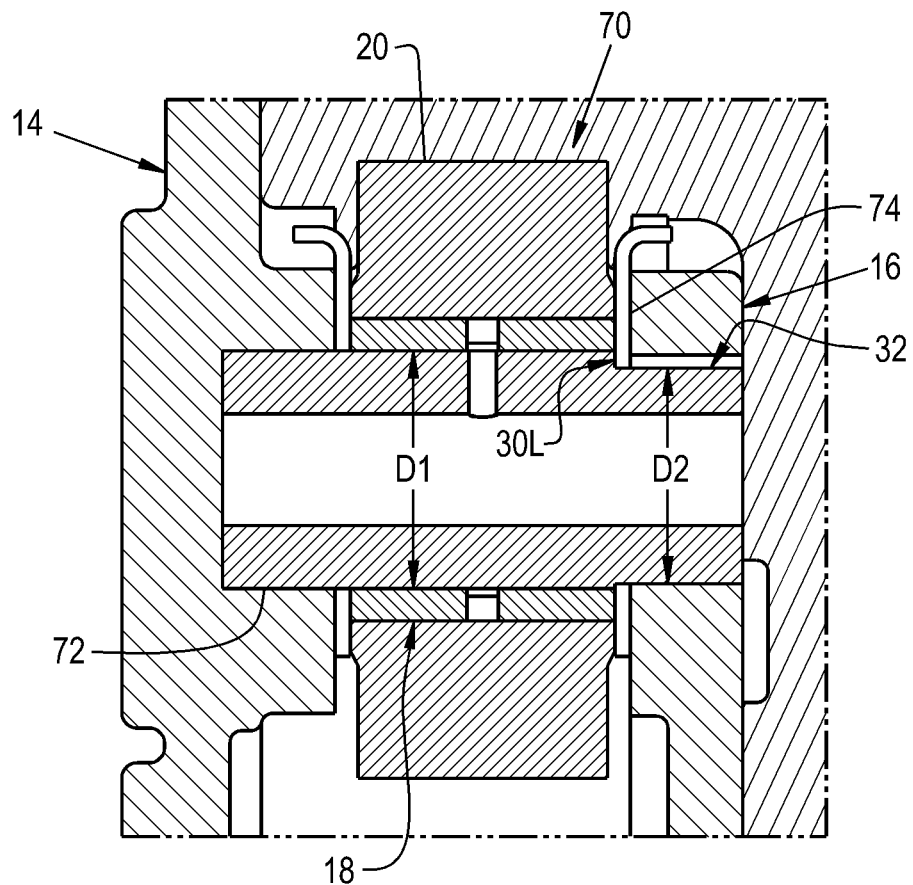
FIG. 10 illustrates a cross-sectional view of another embodiment of a planetary gear assembly in which the pin has only one pin locking feature, in accordance with an exemplary embodiment of the present invention.

Referring now to FIG. 10 there is shown another embodiment of a planetary gear assembly 70 which is substantially similar to the planetary gear assembly 10 or the planetary gear assembly 50, except that each pin 72 only has one shoulder, e.g. the right shoulder 30R, and only one pin locking feature 32. Thus, only one thrust washer 74, e.g., the right thrust washer 74, may include the second locking member 36 or 40 which then engages with the single pin locking feature 32. As shown, the planetary gear assembly 70 includes the planetary carrier 14, the cover 16, the needle bearing(s) 18, and the planetary gear(s) 20. Yet, it should be appreciated that the planetary gear assembly 70 can be substantially similar to the planetary gear assembly 50 such that the pin(s) 72 of the planetary gear assembly 70 replace the pin(s) 22 of the planetary gear assembly 50. It should be appreciated that the other thrust washer (unnumbered) which does not engage with the pin locking feature 32 of the pin 22 may be designed as a thrust washer with a bent tab for engaging the carrier locking feature, or the other thrust washer may be a standard washer.

Figure 11:
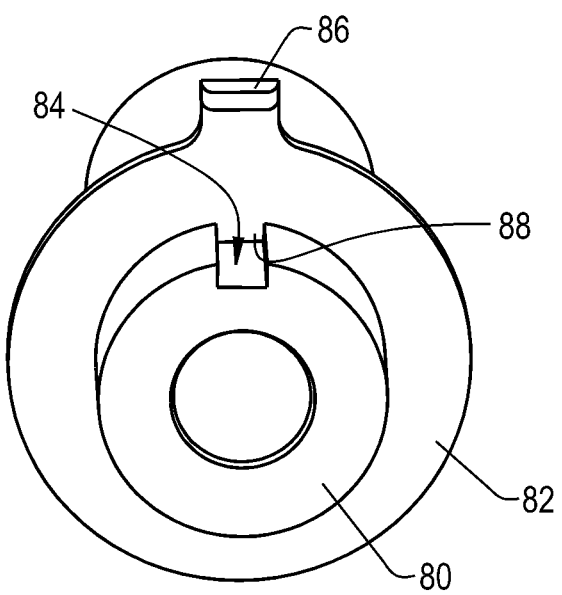
FIG. 11 illustrates a perspective view of another embodiment of a thrust washer and a pin having a key and slot relationship, in accordance with an exemplary embodiment of the present invention.

Referring now to FIG. 11, there is shown another embodiment of a pin 80 and thrust washer 82. The pin 80 and thrust washer 82 can have a key-and-hole type relationship with one another. In more detail, the pin 80 may have a pin locking feature 84 that is in the form of a slot or groove 84 which receives at least a portion of the thrust washer 82. The thrust washer 82 can have a first locking member 86 and a second locking member 88. The first locking member 86 can be in the form of one of the tabs 34, 60, and the second locking member 88 can be the inner periphery of the thrust washer 82 such that the inner periphery includes a protrusion which functions as the second locking member 88. Thereby, the second locking member 88 engages with the groove 84 in order to rotationally fix the pin 80. The pin 80 and the thrust washer 82 may be incorporated into any of the planetary gear assemblies 10, 50, 70.

Figure 12:
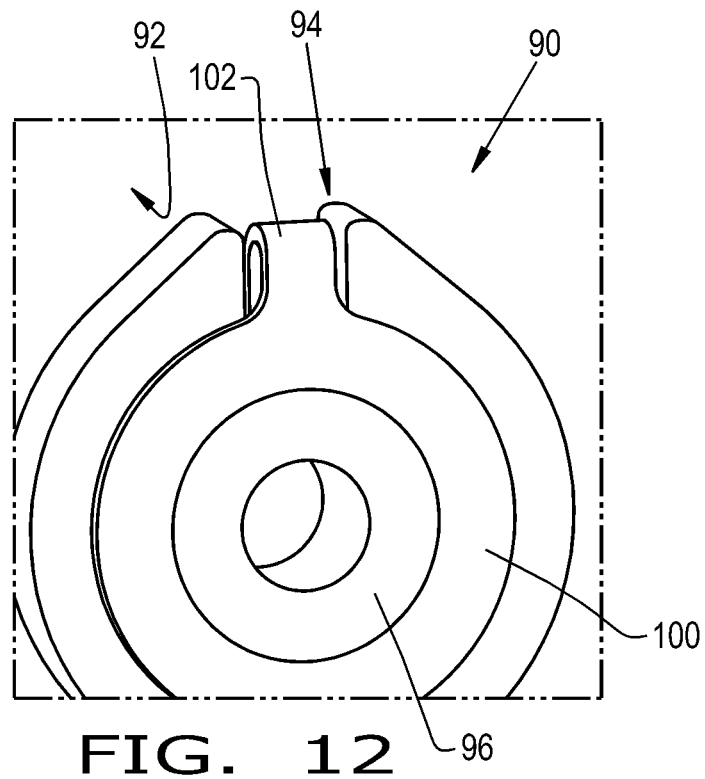
FIG. 12 illustrates a perspective view of another embodiment of a planetary gear assembly including a thrust washer with a hooked tab, in accordance with an exemplary embodiment of the present invention.
Figure 13:
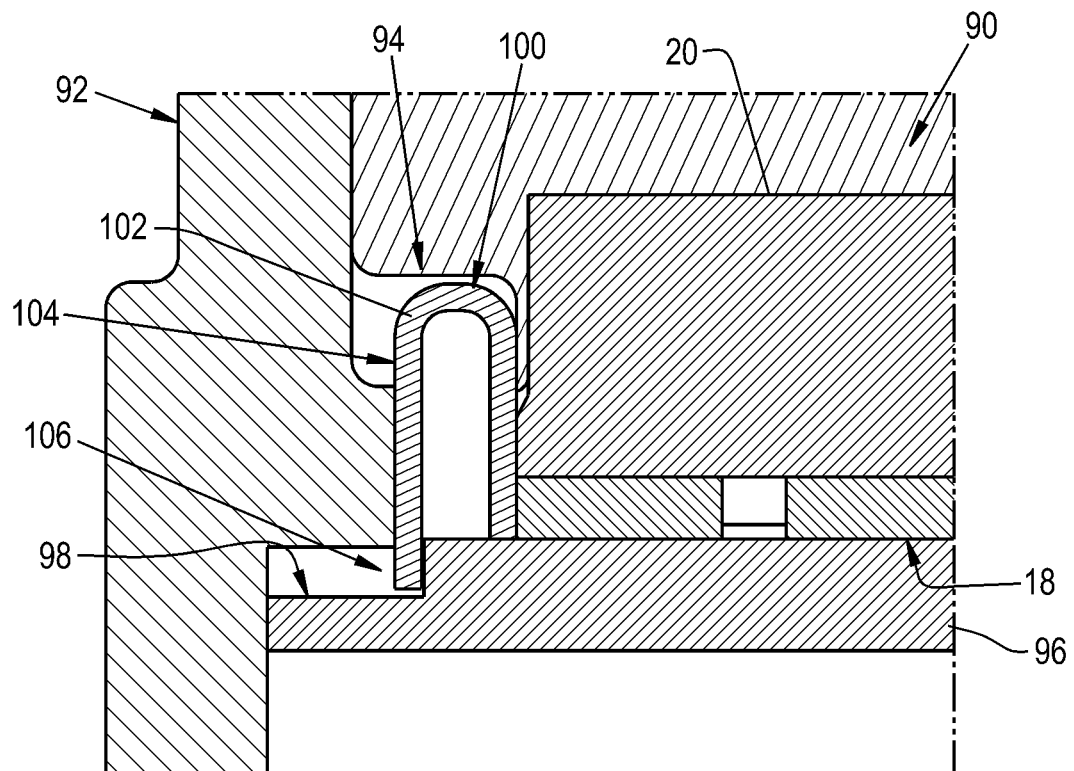
FIG. 13 illustrates a cross-sectional view of the pin and thrust washer of FIG. 12, in accordance with an exemplary embodiment of the present invention.

Referring now to FIGS. 12-13, there is shown another embodiment of a planetary gear assembly 90 that generally includes a planetary carrier 92 with a carrier locking feature 94, the needle bearing(s) 18 and planetary gear(s) 20 as described above, at least one pin 96 with a pin locking feature 98, and at least one thrust washer 100 with a hooked tab 102. The paramount difference between the planetary gear assembly 90 and the other planetary gear assemblies 10, 50, 70 is the hooked tab 102 of the thrust washer 100 includes both of the first and second locking members 104, 106 for respectively engaging with the carrier locking feature 94 and the pin locking feature 98 (FIG. 13).

The planetary carrier 92 may be in the form of the planetary carrier 52 of the planetary gear assembly 50. The pin 96 may be in the form of any one of the pins 22, 72, 80. Thereby, the pin locking feature 98 may be in the form of a flat cutout, groove, slot, recess, or any other desired shape. It should be appreciated that the planetary gear assembly 90 may include a cover (not shown) that may or may not have a cover locking feature. Thereby, the planetary gear assembly 90 may or may not include another thrust washer (not shown) that engages with pin 96 and/or cover in order to prevent the movement of the pin 96.

The thrust washer(s) 100 may engage with the carrier locking feature 94, as shown, and/or with the cover locking feature if it is included in the cover (not shown). The hooked tab 102 protrudes from the outer periphery and includes the first and second locking members 104, 106. In more detail, the first locking member 104 is a first member of the hooked tab 102, for example the upper body, i.e., the inverted U-shaped member of the hooked tab 102, that engages with the carrier locking feature 94 and prevents the rotational movement of the thrust washer 100 relative to the planetary carrier 92. The second locking member 106 is a second member of the hooked tab 102, for example the lower end, that engages with the pin locking feature 98 and prevents the pin 96 from rotating relative to the thrust washer 100. Additionally, the end of the hooked tab 102 also engages with the pin 96, for example the rear wall of the pin locking feature 98, to prevent the pin 96 from axially sliding such that the pin 96 cannot slide out of the cover. It should be appreciated that the thrust washer 90 can be incorporated into any one of the planetary gear assemblies 10, 50, 70. Therefore, one or more thrust washer(s) 100 may simultaneously perform the functions of protecting the needle bearings, planetary carrier, and/or cover, preventing the pin 98 from rotating, and containing the pin 98 so that the pin 98 does not axially slide.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. A vehicle, comprising:
  a chassis; and
  a planetary gear assembly supported by the chassis and including:
    a planetary carrier having a carrier locking feature;
    a cover;
    at least one bearing;
    at least one planetary gear coupled with the at least one bearing and positioned in between the planetary carrier and the cover;
    at least one pin supporting the at least one planetary gear and coupling with the planetary carrier and the cover, the at least one pin including at least one pin locking feature; and
    at least one thrust washer coupled to and supported by the at least one pin, the at least one thrust washer including a first locking member engaging with the carrier locking feature, which prevents the at least one thrust washer from rotating, and a second locking member engaging with the at least one pin locking feature such that the at least one thrust washer prevents the at least one pin from rotating and axially sliding, wherein:
      the at least one thrust washer has an inner periphery, defining an inner shape, that contacts the at least one pin, and the second locking member of the at least one thrust washer is the inner periphery of the at least one thrust washer, and
      the inner shape has a circular portion and a triangular portion extending inwardly from the circular portion, the triangular portion having a first side and a second side, and the at least one pin locking feature contacts one of the first side and second side so that the at least one pin is rotationally fixed by the at least one thrust washer.

2. The vehicle of claim 1, wherein the at least one pin includes a middle portion, with a middle portion diameter, that couples with the at least one bearing, a first side portion that couples with one of the planetary carrier and the cover, the first side portion including the at least one pin locking feature and having a side portion diameter that is smaller than the middle portion diameter such that a respective interface between the middle portion and the first side portion defines a shoulder, and the at least one thrust washer couples with the first side portion of the at least one pin such that the at least one thrust washer abuts the shoulder so that the at least one pin is prevented from axially sliding.

3. The vehicle of claim 1, wherein the at least one thrust washer has an outer periphery, and the first locking member protrudes outwardly from the outer periphery.

4. The vehicle of claim 3, wherein the first locking member is in the form of one of a bent tab and a straight tab.

5. The vehicle of claim 1, wherein the inner shape has a circular portion and a flat portion for contacting the at least one pin locking feature and preventing the at least one pin from rotating.

6. The vehicle of claim 1, wherein the inner periphery includes a protrusion, and the at least one pin locking feature is in the form of a groove such that the protrusion of the inner periphery engages with the groove of the at least one pin so that the at least one pin is rotationally fixed by the at least one thrust washer.

7. The vehicle of claim 1, wherein the at least one thrust washer has an outer periphery and a hooked tab protruding from the outer periphery such that the first locking member is a first member of the hooked tab that prevents the at least one thrust washer from rotating and the second locking member is a second member of the hooked tab that engages with the at least one pin locking feature.

8. The vehicle of claim 2, wherein the cover includes a cover locking feature, the at least one thrust washer includes a first thrust washer and a second thrust washer, and the at least one pin includes a second side portion and a pair of pin locking features respectively located on the first side portion and the second side portion, the first side portion couples with the planetary carrier, the second side portion couples with the cover and has another side portion diameter being smaller than the middle portion diameter such that the first thrust washer couples with the first side portion of the at least one pin, abutting the shoulder at the interface between the first side portion and the middle portion, and the first locking member of the first thrust washer engages with the carrier locking feature and the second locking member of the first thrust washer engages with the pin locking feature of the first side portion, and the second thrust washer couples with the second side portion of the at least one pin, abutting another shoulder at an interface between the second side portion and the middle portion, and the first locking member of the second thrust washer engages with the cover locking feature, and the second locking member of the second thrust washer engages with the pin locking feature of the second side portion.

9. A planetary gear assembly for a vehicle, comprising:
  a planetary carrier having a carrier locking feature;
  a cover;
  at least one bearing;
  at least one planetary gear coupled with the at least one bearing and positioned in between the planetary carrier and the cover;
  at least one pin supporting the at least one planetary gear and coupling with the planetary carrier and the cover, the at least one pin including a first shoulder, a second shoulder, a first pin locking feature, and a second pin locking feature;
  a first thrust washer coupled to and supported by the at least one pin, the first thrust washer abutting the first shoulder for preventing the at least one pin from sliding axially, the first thrust washer including a first locking member engaging with the carrier locking feature for preventing the first thrust washer from rotating, and the first thrust washer including a second locking member engaging with the first pin locking feature for preventing the at least one pin from rotating; and a second thrust washer coupled to and supported by the at least one pin, the second thrust washer includes a locking member engaging with the second pin locking feature, and the second thrust washer abutting the second shoulder for preventing the at least one pin from sliding axially, wherein the first thrust washer and the second thrust washer each include an inner periphery, defining an inner shape, that contacts the at least one pin, and the second locking member of the first thrust washer is the inner periphery of the first thrust washer, and the locking member of the second thrust washer is the inner periphery of the second thrust washer, and wherein the inner shape of each first and second thrust washer has a circular portion and a triangular portion extending inwardly from the circular portion, the triangular portion having a first side and a second side, and the first and second pin locking features contact one of the first side and second side of each first and second thrust washer, respectively, so that the at least one pin is rotationally fixed.

10. The planetary gear assembly of claim 9, wherein the first thrust washer has an outer periphery, and the first locking member protruding outwardly from the outer periphery and engaging with the carrier locking feature.

11. The planetary gear assembly of claim 10, wherein the first locking member of the first thrust washer is in the form of one of a bent tab and a straight tab.

12. The planetary gear assembly of claim 9, wherein the inner shape of each first and second thrust washer has a circular portion and a flat portion for contacting and preventing the at least one pin from rotating.

13. The planetary gear assembly of claim 9, wherein the inner periphery of each first and second thrust washer includes a protrusion, and each first and second pin locking feature is in the form of a groove such that a respective protrusion engages with a respective groove so that the at least one pin is rotationally fixed.

\* \* \* \* \*